Sept. 27, 1949.    R. B. COTTRELL    2,483,361
SPRING GROUP

Filed July 7, 1944    3 Sheets-Sheet 1

INVENTOR.
Robert B. Cottrell
BY

Sept. 27, 1949.  R. B. COTTRELL  2,483,361
SPRING GROUP

Filed July 7, 1944  3 Sheets-Sheet 2

INVENTOR.
Robert B. Cottrell,
BY
O. B. Garner
Atty.

Sept. 27, 1949.  R. B. COTTRELL  2,483,361
SPRING GROUP

Filed July 7, 1944  3 Sheets-Sheet 3

INVENTOR.
Robert B. Cottrell
BY

Patented Sept. 27, 1949

2,483,361

UNITED STATES PATENT OFFICE 2,483,361

SPRING GROUP

Robert B. Cottrell, Chicago, Ill., assignor to American Steel Foundries, Chicago, Ill., a corporation of New Jersey Application July 7, 1944, Serial No. 543,801

10 Claims. (Cl. 267—9)

1

My invention relates to a novel form of spring group including coil springs and means for snubbing the action of said springs, designed particularly for use where long travel springs are required but equally useful with standard length springs.

The general object of my invention is to devise such a spring group which will afford satisfactory resistance to out-of-square movement between the supporting and supported members while at the same time giving a satisfactory ride from the standpoint of control of oscillations.

A more specific object of my invention is to provide a combination coil and snubber arrangement wherein pairs of coil springs may be supported at respective ends of the device and a friction device may be intermediately positioned, said friction device comprising a plurality of spaced pairs of friction elements so positioned as to function as before mentioned.

Another object of my invention is to devise a spring group of the character described wherein the snubbing means positioned intermediate pairs of coil springs may comprise a plurality of sets of friction shoes each having V-shaped engagement with a wall of a friction housing with the shoes of respective sets positioned adjacent the lateral edges of the group.

In both modifications of my invention I have illustrated the friction shoes as having V-shaped friction surfaces on their remote faces, but the two modifications differ from each other in that in the one case the opposed V-shaped friction surfaces on the housing are formed on diverging walls thereof while in the other modification the corresponding surfaces are formed along converging walls.

Figure 1:
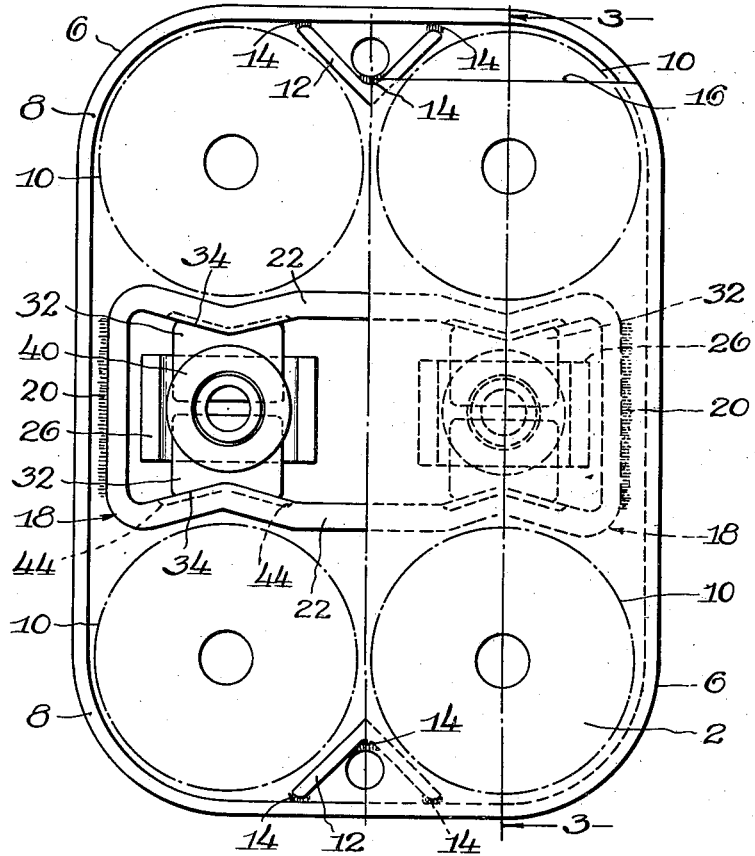
Figure 2:
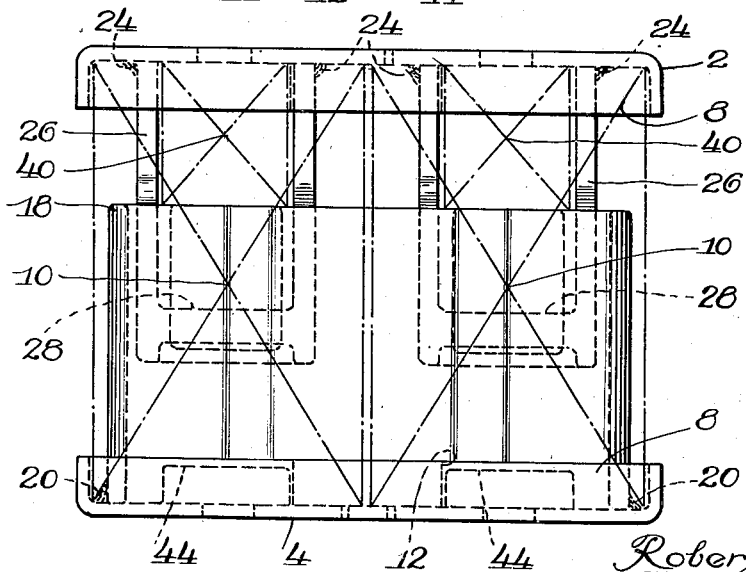

In the drawings, Figure 1 is a top plan view of a spring group embodying my invention, one half of the top plate being cut away at the left of the figure to better illustrate the parts therebeneath; Figure 2 is an end view thereof, taken from the bottom as seen in Figure 1; and Figure 3 is a sectional view taken through the group shown in Figures 1 and 2, approximately in the vertical plane indicated by the line 3—3 of Figure 1.

Figure 6:
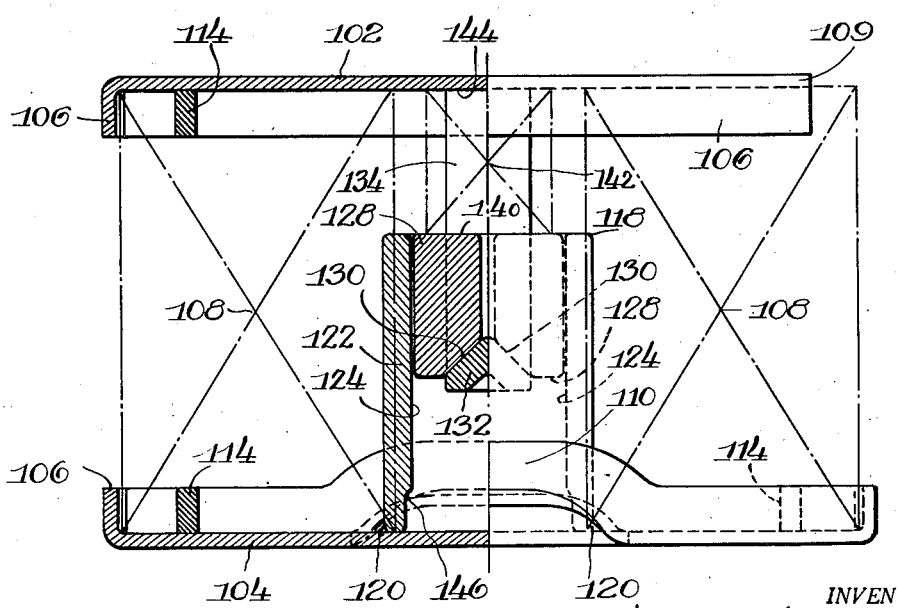
Figure 4:
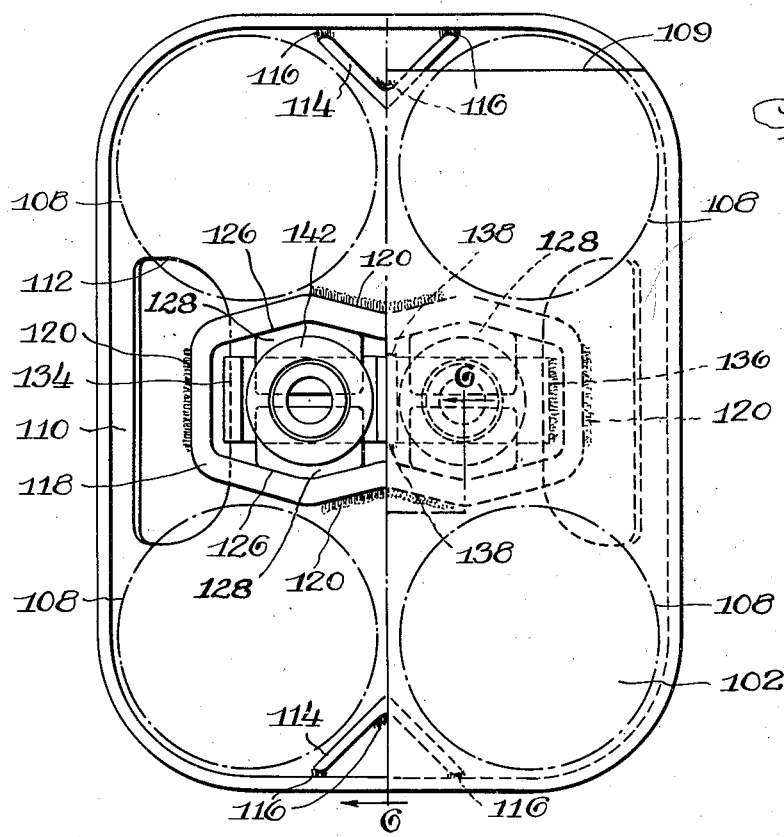
Figure 5:
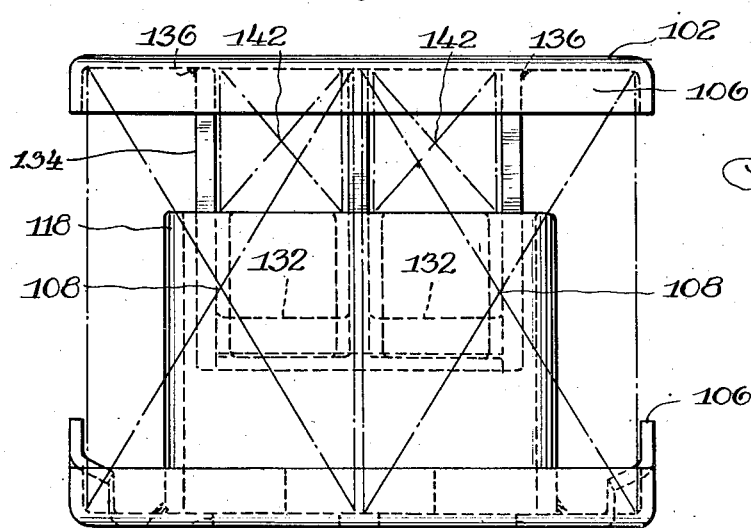

Figure 4 is a top plan view of the spring group embodying the second modification of my invention, one half of the top plate being cut away at the left of the figure to better illustrate the parts therebeneath; Figure 5 is an end view taken from the bottom as seen in Figure 4; and Figure 6 is a side elevation, half in section, the section being taken approximately in the vertical planes indicated by the line 6—6 of Figure 4.

2

Figure 3:
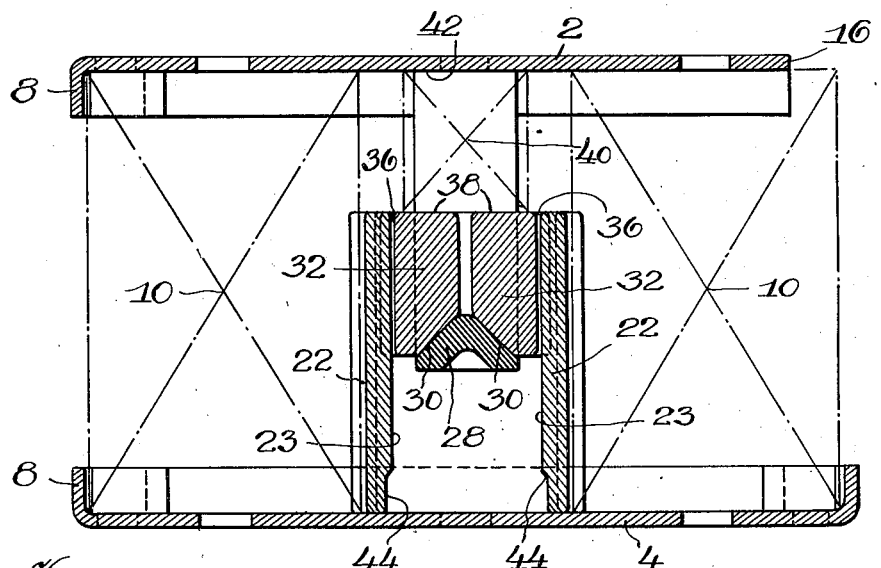

Describing first in detail the modification illustrated in Figures 1 to 3, my novel spring group comprises identical top and bottom plates 2 and 4 of generally rectangular form with arcuate corners, as clearly seen at 6, 6 in Figure 1, each of said plates having inturned flanges 8, 8 extending continuously about the perimeter thereof and serving in part as operating means for pairs of coil springs diagrammatically indicated at 10, 10 at each end of the group. Intermediate the coils of each pair, additional angular positioning means 12, 12 may be welded to top and bottom plates as at 14, 14. The top plate 2 may be cut away at one end as at 16 (Figure 1) to afford additional clearance for the supported member or bolster.

Intermediate the pairs of coil springs at opposite ends of the group may be positioned my novel snubbing means comprising a generally rectangular friction housing 18, the opposite ends of which may be welded as at 20, 20 to the bottom plate 4 so that to all intents and purposes said housing is an integral part of said bottom plate. The opposite longitudinal walls 22, 22 of the housing may each have a pair of V-shaped friction surfaces 23, 23 (Figure 3) so that a pair of such surfaces is arranged adjacent each end of the housing, the respective portions of opposite walls converging so that the apexes of the opposed surfaces are the nearest points thereof. Secured to the top plate 2 at opposite sides thereof, as by welding at 24, 24, may be a yoke or shoe carrier 26, the respective shoe carriers 26, 26 being arranged in telescoping relationship with the opposed housing 18 adjacent opposite ends thereof, each of said yokes having at its extremity a V-shaped web 28 (Figure 3) presenting diverging faces for frictional engagement as at 30, 30 for the friction shoes 32, 32 supported thereby, each of said friction shoes having a V-shaped friction face engaging as at 34 the complementary friction surface on the adjacent housing wall 22. Each friction shoe is afforded slight clearance from the adjacent friction wall of the housing at the apex of the V-shaped surface, as clearly seen at 36, 36 in the sectional view of Figure 3. Each pair of friction shoes 32, 32 may have coplanar top surfaces affording a seat as at 38 for the auxiliary coil spring diagrammatically indicated at 40, the opposite end of which may seat as at 42 against the top plate 2. Each friction wall 22 of the housing 18 may be cored away or relieved as at 44 beneath the adjacent friction surface 23 so that shoulders will not be formed adjacent the extremities of said friction faces 23, 23 as wear takes place.

It will be understood by those skilled in the art that in my novel arrangement the friction housing operates as an integral portion of the bottom spring plate while the remainder of the friction device moves as a unit with the top spring plate inasmuch as the shoe carrier is fixed thereto, so that the auxiliary spring 80 is under a substantially constant compression at every portion of the friction stroke and in both directions thereof.

In the modification illustrated in Figures 4, 5 and 6, a generally similar arrangement is provided to that just described with certain differences of detail, as hereinafter set forth. In the modification now under consideration, the top and bottom spring plates 102 and 104 are each generally rectangular in form with inturned flanges 106, 106 affording positioning means for coil springs 108, 108 confined therebetween. The top spring plate may have the inner end thereof cut away as at 109 as in the previous modification. The bottom spring plate 104 may have at the opposite edges thereof a corrugated portion 110 (Figure 6), so formed to accommodate the seating of the spring group in a well known form of side frame tension member, said bottom plate 104 being cut away as at 112 adjacent said corrugated portion 110 to form an elongated opening, as well illustrated in the top plan view of Figure 4. Additional angular positioning means 114, 114 may be welded as at 116, 116 to the top and bottom plates intermediate the coils 108, 108. At each end of the group and between the pairs of coils at opposite ends of the spring group may be positioned my novel friction device or snubber comprising the generally rectangular open-ended housing 118, welded at intermediate portions of the lateral bottom edges thereof as at 120, 120 (Figure 4) to the bottom plate 104 so that said housing is substantially integral with said bottom plate. Each longitudinal wall 122 of the housing 118 may present a pair of V-shaped vertical friction surfaces 124, 124 which may have engagement as at 126, 126 with complementary friction surfaces on the friction shoes 128, 128 seated thereagainst. Each friction shoe 128 may have a flat diagonal face in frictional engagement as at 130 with the complementary face formed on the upper surface of the V-shaped transverse web 132 formed as an integral part of the double yoke or shoe carrier 134, the upper extremity of said yoke being welded as at 136 at each end thereof and as at 138, 138 at the lateral edges thereof to the top plate 102 (Figure 4). The top surfaces of each pair of friction shoes 128, 128 may be coplanar to form a seat as at 140 for the auxiliary spring 142, the opposite ends of which may seat as at 144 against the top plate 102. As in the previous modification, it will be observed that the friction housing 122 moves as a unit with the bottom plate 104, while the remainder of the friction device moves as a unit with the top plate 102 by virtue of the fact that the carrier 134 is fixed to the top plate and the shoes are actuated thereby.

Inwardly of each friction surface 124, each housing wall may be relieved as at 146, as in the previous modification.

In this modification it will be observed that the friction surfaces of the housing are reversely arranged as compared with the modification illustrated in Figures 1 to 3, so that the apexes of the V-shaped friction surfaces of the housings are the most remote portions of said friction surfaces. Functionally, the two modifications are quite similar in that the friction means is so arranged as to effectively snub the action of the springs and at the same time serve as efficient squaring means.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a composite spring group, spaced spring plates, pairs of coil springs compressed between said plates adjacent opposite ends thereof, a friction device interposed between said pairs and including a substantially rectangular friction housing extending lengthwise transversely of said plates and fixed to one of the same and presenting adjacent each end thereof reversely arranged laterally opposed V-shaped friction surfaces and shoe-carrying means including a yoke rigidly supported on the other of said plates adjacent each end of said housing in telescoping relationship therewith, each of said yokes supporting a pair of friction shoes in engagement with respective surfaces, and resilient means urging said shoes into engagement therewith, each of said yokes presenting diagonally arranged flat faces engaging the respective shoes of the adjacent supported pair of shoes.

2. A spring group comprising top and bottom substantially rectangular plates, a coil spring at each corner of said plates confined therebetween, a friction device disposed medially of said plates and comprising an elongate friction housing fixed to one of said plates and extending lengthwise transversely of said plates with each end thereof disposed between a pair of springs, said housing having portions adjacent the respective springs converging away from said springs inwardly of said housing and defining V-shaped friction surfaces, shoe-carrying means fixed to the other of said plates and supporting pairs of friction shoes adjacent each end of said housing in complementary engagement with the adjacent surfaces, the shoes of each pair having reversely arranged diagonal flat face engagement with said shoe-carrying means, and resilient means compressed between each pair of shoes and said last-mentioned plate for urging said shoes into said engagement.

3. A spring group comprising top and bottom plates, pairs of coil springs confined therebetween, and a friction device intermediate said pairs comprising an elongate friction housing secured to one of said plates, said housing having V-shaped portions at opposite sides thereof adjacent each of said springs defining laterally opposed V-shaped friction surfaces internally of said housing, and shoe-carrying means fixed to the other of said plates and supporting pairs of friction shoes for engagement with said surfaces, the shoes of each pair having reversely arranged diagonal flat face engagement with said shoe-carrying means and vertically arranged V-shaped frictional engagement with said opposed friction surfaces.

4. A spring group comprising top and bottom plates, pairs of coil springs confined therebetween comprising a housing fixed to one of said plates substantially centrally thereof, said housing having longitudinal walls V-shaped at the ends thereof affording maximum clearance for the adjacent springs and defining laterally opposed V-shaped friction surfaces internally of said housing adjacent the ends thereof, and shoe-carrying means fixed to the other of said plates supporting pairs of friction shoes adjacent each end of said housing for engagement with the adjacent opposed friction surfaces on said walls, the shoes of each pair having reversely arranged diagonal flat face engagement with said shoe-carrying means and vertically arranged V-shaped frictional engagement with said adjacent surfaces, said shoe-carrying means comprising resilient means compressed between each pair of shoes and the adjacent plate.

5. A spring group comprising spaced plates confining therebetween sets of coil springs adjacent opposite ends of said group, a friction device interposed between said sets and comprising an elongate friction housing having end walls and side walls, the latter being V-shaped at the ends thereof to afford maximum clearance for said springs and defining pairs of vertical laterally opposed friction surfaces at opposite ends of said housing and shoe-carrying means fixed to the other plate and arranged in telescoping relationship with said housing, a pair of friction shoes supported by said shoe-carrying means adjacent each pair of surfaces, each pair of shoes having reversely arranged diagonal flat face engagement with said shoe-carrying means and vertically arranged V-shaped frictional engagement with the associated surfaces, and resilient means compressed between each pair of shoes and said last-mentioned plate.

6. In a composite spring group, spaced spring plates, pairs of coil springs compressed between said plates adjacent opposite ends thereof and a friction device interposed between said pairs and including a friction housing fixed to one of said plates, said housing having a friction wall adjacent each pair of springs with portions of each wall nearest said springs V-shaped to afford maximum space for said springs and to form vertical V-shaped opposed friction surfaces internally of said housing adjacent opposite ends thereof, yoke means fixed to the other plate and arranged in telescopic relationship with said housing, and friction means carried by said yoke means adjacent said surfaces for complementary frictional engagement therewith.

7. A spring group comprising spring plates with pairs of coil springs confined therebetween adjacent opposite ends thereof, and a friction device intermediate said pairs between said plates comprising a friction housing fixed to one of said plates, said housing having spaced friction walls disposed adjacent respective pairs of springs, said walls being contoured at the ends thereof to afford maximum space for said springs and to form opposed angularly related friction surfaces on the adjacent sides thereof at opposite ends of said housing, shoe-carrying means supported on the other of said plates in telescopic relationship with said housing, friction shoes carried by said means in engagement with respective surfaces, and resilient means urging said shoes into engagement therewith.

8. A spring group comprising spaced spring plates, sets of coil springs confined therebetween adjacent opposite ends thereof and a friction device intermediate said sets and including a friction housing fixed to one of said plates, said housing having a pair of spaced opposed friction walls disposed adjacent respective sets of springs, each wall having portions thereof nearest each spring of the associated set contoured to afford maximum space for said springs and to form angularly arranged vertical friction faces internally of said housing, yoke means fixed to the other plate and supporting pairs of friction shoes having friction surfaces in complementary engagement with the adjacent faces, and auxiliary spring means compressed between each pair of shoes and said last-mentioned plate for urging said shoes into said engagement.

9. A spring group comprising spaced plates confining therebetween sets of coil springs adjacent opposite ends of said group and a friction device interposed between said sets, said device comprising an elongate housing having spaced opposed friction walls extending longitudinally of the housing and disposed adjacent respective sets of springs, each wall having portions thereof nearest each spring of the associated set arranged in a V with the apex thereof directed inwardly of the housing to afford maximum clearance for said spring and to form a vertical V-shaped friction face internally of said housing, shoe-carrying means fixed to the other plate and having a friction surface adjacent each V-shaped face and sloping downwardly toward the same, a friction shoe on each surface in wedge engagement therewith and having vertical V-shaped surfaces in complementary frictional engagement with the associated face, and resilient means compressed between each shoe and said last-mentioned plate for urging the shoe into said engagement.

10. A spring group comprising spaced spring plates with pairs of coil springs confined therebetween adjacent opposite ends thereof and a friction device comprising a housing fixed to one of said plates, said housing having spaced opposed walls with each wall being positioned adjacent a set of said springs, said walls having portions of V section adjacent each spring with the apex of the V directed away from said spring to accommodate maximum space therefor, said portions on the respective walls forming opposed V-shaped friction surfaces with the apexes thereof disposed adjacent each other, friction shoe-carrying means fixed to the other plate and arranged in telescopic relationship with said housing and presenting adjacent each pair of said opposed surfaces reversely arranged diagonal faces, a pair of friction shoes in complementary engagement with each pair of surfaces and seated on said faces, and springs between each pair of shoes and said last-mentioned plate for urging said shoes along said faces into said engagement.

ROBERT B. COTTRELL.

REFERENCES CITED

The following references are of record in the file of this patent:

UNITED STATES PATENTS

| Number | Name | Date |
|---|---|---|
| 1,301,946 | Johnson | Apr. 29, 1919 |
| 1,985,369 | Fuchs | Dec. 25, 1934 |
| 2,011,773 | O'Connor | Aug. 20, 1935 |
| 2,059,503 | Webb | Nov. 3, 1936 |
| 2,072,274 | Olander | Mar. 2, 1937 |
| 2,118,006 | Couch | May 17, 1938 |
| 2,265,392 | Olander | Dec. 9, 1941 |
| 2,295,548 | Cottrell | Sept. 15, 1942 |
| 2,306,397 | Cottrell | Dec. 29, 1942 |
| 2,382,563 | Haseltine | Aug. 14, 1945 |
| 2,398,751 | Light | Apr. 16, 1946 |